United States Patent Office 2,695,036
Patented Nov. 23, 1954

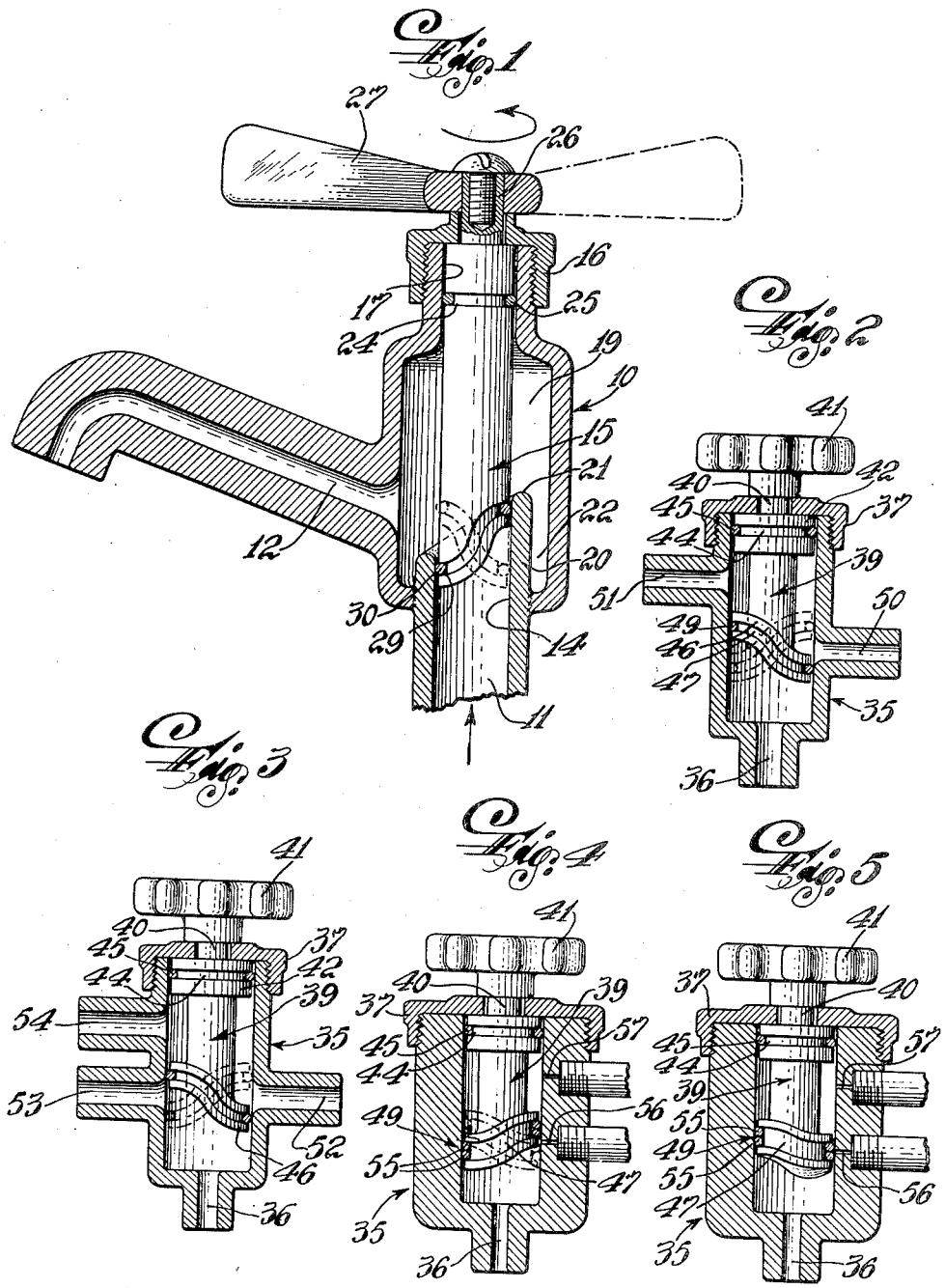

2,695,036

VALVE

John H. Kronheim, Bloomfield, N. J., assignor to Kidde Manufacturing Co., Inc., Bloomfield, N. J., a corporation of Delaware Application June 30, 1949, Serial No. 102,236

6 Claims. (Cl. 137—625.11)

The present invention relates to valves, particularly to improvements in valves of the rotary plug type for controlling the flow of fluid.

Accordingly, an object of the present invention is to provide such a valve wherein gasket means form a fluid tight seal between the ports of the valve.

Another object is to provide such a valve wherein the gasket means are subjected to a minimum amount of wear, thereby eliminating leakage and the necessity of frequent replacement of the gasket means.

A further object is to provide valves of the foregoing character which are simple and economical in construction and are readily manufactured and assembled.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are accomplished by providing a valve comprising a casing having an inlet, an outlet and a cylindrical bore portion between the inlet and outlet, a valve member having a portion mounted for axial rotation in the bore portion, an annular oblique groove in one of the portions, and annular gasket means, preferably an O-ring, in the groove and engaging the other portion for controlling the flow of fluid between the inlet and outlet. In a preferred embodiment of the invention, the groove is formed in the valve member and engages the wall defining the bore. Such oblique O-ring arrangement may be utilized in valves having one or more inlet and outlet ports wherein the O-ring may be moved into one position to connect or disconnect certain ports and may be moved into another position to connect or disconnect other ports. The arrangement may be further modified to provide for an intermediate O-ring position adapted to shut off communication between all the ports.

Preferred embodiments of the invention have been chosen for purposes of illustration and description, and are shown in the accompanying drawing, forming a part of the specification, wherein:

Figure 1 is a longitudinal sectional view of a valve in accordance with the invention.

Figure 2 is a longitudinal sectional view of a valve illustrating another embodiment of the invention.

Figure 3 is a longitudinal sectional view illustrating another form of valve embodying the invention.

Figures 4 and 5 are longitudinal sectional views illustrating still another form of valve with the valve member thereof in various positions to control the flow of fluid therethrough.

Referring to Figure 1 of the drawing in detail, there is shown a valve comprising a casing 10 having an inlet 11, an outlet 12 and a cylindrical bore 14 between the inlet and the outlet, and a valve member 15 having a portion disposed in the bore for controlling the flow of fluid between the inlet and the outlet.

The upper end of the valve casing has an opening therein for inserting the valve member, and an apertured cap 16 is threadedly secured over this opening. Adjacent the opening, a cylindrical bore portion 17 is provided which cooperates with the bore 14 for mounting the valve member for axial rotation therein as about to be described. The portion of the casing intermediate the bore and the bore portion is somewhat enlarged to provide a passageway 19 surrounding the valve member, and the bore 14 is formed in a sleeve-like portion 20 having an oblique upper end 21 and being surrounded by an annular well 22.

The valve member 15 is generally cylindrical and has a cylindrical upper portion disposed in the bore portion 17 which is provided with an annular groove 24 for receiving a gasket, such as an O-ring 25, adapted to form a leakage preventing seal at the upper end of the valve casing. A stem portion 26 is provided at the top of the valve member which extends through the aperture of the cap 16 and has an operating handle 27 attached thereto. The lower portion of the valve member also is cylindrical and has an oblique end extending into the bore 14. An oblique annular groove 29 extends about the lower portion of the valve member adjacent and parallel to the lower end thereof in which an annular gasket, such as an O-ring 30, is seated. The O-ring faces the bore and is adapted to engage the wall defining the bore to form a seal along a zone parallel to the upper end 21 of the bore for controlling the flow of fluid through the bore.

The casing may be constructed in two parts as shown, one of the parts including the inlet 11 and the portion 20 and the other part including the other casing elements and having an opening for receiving and securing the inlet part therein by welding, brazing or other suitable means.

In operation, with the handle and valve member in the full line position as shown, the O-ring forms a continuous seal with the wall of the bore 14 to prevent the flow of fluid from the inlet 11 to the outlet 12. Upon rotation of the valve member to the broken line position as shown, the O-ring is in a plane at right angles to the plane in which the end 21 of the bore is disposed with the upper side of the ring well above the lower side of the end 21 of the bore, whereby an opening is provided between the end of the bore and the lower end of the valve member to permit the flow of fluid from the inlet through the valve casing to the outlet. By rotating the valve member into positions intermediate the full open and shut off positions, the rate of flow can be regulated.

The valve illustrated and described in connection with Figure 1 is of the water faucet type. Such a valve has a much longer life than valves embodying compression-type-seat gaskets.

In Figures 2, 3, 4 and 5, valves are shown which comprise a casing 35 having a cylindrical bore or chamber provided with a port 36 at the lower end and an opening at the top, an apertured cap 37 threadedly secured to the casing over the opening, and a valve member 39 mounted for rotation in the chamber.

The valve member 39 comprises a stem 40 at its upper end extending through the cap and having a hand wheel 41 or the like attached thereto, a cylindrical portion 42 in the upper end of the chamber formed with an annular groove 44 in which an O-ring 45 or the like is disposed, and a cylindrical portion 46 at the lower end of the valve member formed with an oblique annular groove 47 in which gasket means 49, such as O-rings, are disposed. The cylindrical portions 46 shown in Figures 2 and 3 have oblique upper and lower ends parallel and adjacent to the gasket means groove 47.

The valve shown in Figure 2 has a port 50 located above the lowermost position of the cylindrical portion 46 and below the uppermost position of this portion, and has a port 51 located above the uppermost position of the cylindrical portion.

By rotation of the valve member into either the full or broken line position as shown, communication between the ports 50 and 51 or the ports 50 and 36, respectively, may be established. Such a valve may be used as a two way selector valve (from 50 to 36 or 51), or for admitting fluid to a single acting piston chamber or the like from port 51 to port 50 and then bleeding off the fluid from port 50 to port 36.

The valve shown in Figure 3 has a pair of diametrically opposite ports 52 and 53 located above the lowermost position of the cylindrical portion 46 and below the uppermost position of this portion, and has a port 54 located above the uppermost position of the cylindrical portion.

By rotation of the valve member into either the full or broken line position as shown, communication between the ports 36 and 53 and the ports 52 and 54 or the ports 36 and 52 and the ports 53 and 54, respectively, may be established. Such a valve may be used in connection with a double acting piston chamber or the like.

In Figures 4 and 5, the valve member 39 shown is generally cylindrical and forms a loose fit with the bore or chamber of the valve casing to provide a passage for gas or liquid which is sealed off by the O-ring 45 at the upper end and is controlled by the gasket means 49 cooperating with ports as about to be described.

The gasket means 49 in this embodiment of the invention comprise a pair of O-rings 55 placed side by side in the oblique groove 47, and the valve has a pair of the ports 56 and 57 which have a diameter smaller than that of the cross-section of one of the O-rings 55. The port 56 is located below the lower ring 55 when in its upper-most position and above the upper ring 55 when in its lowermost position. The port 57 is located below the O-ring 45 and above the upper ring 55 when in its uppermost position.

By rotation of the valve member into the full or broken line position shown in Figure 4, communication is established, respectively, between the ports 36 and 56 or the ports 56 and 57. When the valve member is in an intermediate position, as shown in Figure 5, the upper ring 55 is between the ports 56 and 57 and the lower ring 55 is between the ports 36 and 56, whereby flow of fluid between any of the ports will not take place.

Such a valve is particularly useful in connection with tubal insufflation apparatus wherein a measured supply of gas is conducted from the port 36 to a gasometer connected to the port 56 (Figure 4), the supply is shut off (Figure 5), and the gas is conducted from the gasometer by way of the port 56 to the point of use which is connected to the port 57 (Figure 4, broken line position).

From the foregoing description, it will be seen that the present invention provides an improved valve which is simple, practical and economical in construction, and requires a minimum of repair or replacement of parts to prevent leakage. The oblique arrangement of the retaining groove and the O-ring mounted therein imparts a wobbling motion to the ring when the valve member is rotated. A section of the ring wipes across one or more ports in the valve casing bore, thereby alternately connecting and disconnecting the ports in a manner which minimizes wear of the ring. The valves in accordance with the invention can readily withstand such rough usage to which they normally may be subjected.

By varying the angle of obliqueness of the gasket and the location of the elements associated therewith for effecting connection between ports, the valve can be designed for rapidly or slowly establishing flow communication between ports. For example, by increasing the angle of obliqueness with respect to a plane perpendicular to the axis of rotation of the valve member, communication between ports can be established more rapidly, and, by decreasing such angle, communication can be established more slowly.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A valve comprising a casing having a cylindrical bore, a valve member mounted for axial rotation in said bore having an oblique end provided with an annular oblique groove adjacent said end facing said bore, and an annular gasket in said groove engaging the wall defining said bore, said casing having a port in communication with said bore below the lower edge of said oblique valve member end, a second port in communication with said bore between the upper and lower edges of said oblique valve member end, and a third port in communication with said bore above the upper edge of said oblique valve member end.

2. A valve according to claim 1, wherein said casing has a fourth port in communication with said bore above the upper edge of said oblique valve member end.

3. A valve comprising a casing having a cylindrical bore, a valve member mounted for axial rotation in said bore having an oblique surface facing one end of said bore and an annular oblique groove extending thereabout adjacent said surface and facing said bore, and annular gasket means in said groove engaging the wall defining said bore, said casing having a port in communication with said bore below the lowermost edge of said gasket means, a second port in communication with said bore between uppermost and lowermost edges of said gasket means, and a third port in communication with said bore above the uppermost edge of said gasket means.

4. A valve comprising a casing having a cylindrical bore, a valve member mounted for axial rotation in said bore having an oblique surface facing one end of said bore and an annular oblique groove extending thereabout adjacent said surface and facing said bore, and annular gasket means including a pair of adjacent O-rings in said groove engaging the wall defining said bore, said casing having a port in communication with said bore below the lowermost edge of said gasket means, a second port in communication with said bore between uppermost and lowermost edges of said gasket means, and a third port in communication with said bore above the uppermost edge of said gasket means, said second and third ports having a diameter smaller than that of the cross section of one of said O-rings.

5. A valve comprising a casing having a tubular chamber formed with upper and lower cylindrical bore portions at the ends thereof; a valve member mounted in said chamber for rotation about its longitudinal axis and formed with spaced apart upper and lower generally cylindrical portions disposed in said upper and lower cylindrical bore portions respectively, said upper valve member portion being provided with an annular groove disposed in a plane perpendicular to the axis of rotation of said valve member, said lower valve member portion having oblique upper and lower ends and being provided with an annular groove between said ends and obliquely disposed with respect to the axis of rotation of said valve member, said valve member having a stem section between its cylindrical portions of smaller cross-sectional area than said chamber and being spaced from the casing wall defining said chamber to provide an annular passageway about said stem section; and an O-ring in each of said grooves engaging the casing wall defining said cylindrical bore portions respectively; said casing having a port in communication with said lower bore portion below the lower end of said lower valve member portion, said casing having a second port in communication with said chamber between the upper and lower ends of said lower valve member portion and said casing having a third port in communication with said bore above the upper end of said lower valve member portion, said annular passageway serving to establish fluid flow communication between said second and third ports.

6. A valve according to claim 5, wherein said casing has a fourth port in communication with said bore diametrically opposite said second port.

References Cited in the file of this patent

UNITED STATES PATENTS

| Number | Name | Date |
| --- | --- | --- |
| 1,459,809 | Wangenheim | June 26, 1923 |
| 1,634,960 | Rahling | July 5, 1927 |
| 2,492,006 | Raybould | Dec. 20, 1949 |
| 2,547,116 | Gould | Apr. 3, 1951 |

FOREIGN PATENTS

| Number | Country | Date |
| --- | --- | --- |
| 13,865 | Great Britain | 1884 |
| 9,032 | Great Britain | 1889 |
| 710,360 | France | 1931 |